United States Patent Office 3,531,215
Patented Sept. 29, 1970

3,531,215
SURFACE AERATION OF LIQUIDS
Frank Sanderson, 5 Spring Bank Lane, Norden,
Rochdale, Lancashire, England
Filed July 23, 1968, Ser. No. 746,847
Claims priority, application Great Britain, Jan. 16, 1968,
2,241/68
Int. Cl. C02c 1/32; B01f 5/18
U.S. Cl. 416—181                    10 Claims

ABSTRACT OF THE DISCLOSURE

A surface aeration apparatus comprises an inverted truncated cone mounted for rotation about a vertical axis whilst partially submerged in the liquid to be treated, blades fixed to the interior surface of the cone so that liquid entering at the bottom opening of the latter is discharged upwardly and outwardly at its upper edge by centrifugal force, and a substantially flat annular shroud arranged concentric with the cone in a horizontal plane spaced above its upper edge and extending into the path of the discharged liquid to deflect the same downwardly. Preferably the shroud, which may be of circular or polygonal planform, overhangs the outer periphery of the cone and terminates in a downwardly-inclined lip. The inner periphery of the cone, which may be formed in several sections lap jointed each to the next, may serve to connect a driving disc to a concentric ring reinforcing the upper ends of the internal blades or be secured to spokes connecting a driving hub to the said reinforcing ring. The cone may have external blades leading to a flat peripheral lip thereon.

---

Preferably the shroud, which may be of circular or polygonal planform, overhangs the outer periphery of the cone and terminates in a downwardly-inclined lip.

The inner periphery of the cone, which may be formed in several sections lap jointed each to the next, may serve to connect a driving disc to a concentric ring reinforcing the upper ends of the internal blades or be secured to spokes connecting a driving hub to the said reinforcing ring.

The cone may have external blades leading to a flat peripheral lip thereon.

This invention relates to the surface aeration of liquids (as, for example, in the activated-sludge treatment of sewage) and is particularly concerned with aeration apparatus of the type in which a bladed inverted cone is mounted for rotation about a vertical axis whilst at least partially submerged in a tank of the liquid to be treated.

In one well-known apparatus of the type aforesaid the cone is truncated and has at least the main blading fixed to its interior surface, so that liquid entering the bottom opening of the cone is discharged centrifugally over the lip of the latter as it rotates.

The lower edge of the cone either makes an airtight joint with the top of a stationary uptake tube supported clear of the tank bottom, or is united to a dependent cylindrical neck and/or flared skirt, so that, whichever arrangement is used, the liquid thrown across the tank surface by the rotating blades tends to pass downwardly and inwardly to such uptake member, the cone thus effecting not only surface aeration, but also a general vertical motion and continuous circulation of the tank's whole contents, whereby sewage and bacteria-laden sludge can be intimately mixed and repeatedly brought to the surface in intensely-aerated condition.

The wall of the known aerating cone just mentioned has a substantial inclination (for example, 40 degrees) to the horizontal so that the discharged liquid pours over the lip of the cone in a thick annular cascade which has a short steep trajectory and produces concentric standing waves whose height diminishes progressively towards the periphery of the tank.

The present invention has for its object to provide an improved rotary aeration apparatus of the type referred to, and is based on the appreciation that at high rates of rotation a substantial proportion of the kinetic energy imparted to the liquid is dissipated in producing an upsurge at the tank periphery instead of contributing to the desired circulatory effect.

The improved apparatus hereinafter described is designed to obviate this drawback, and has been found to result in a substantially higher oxygen input to the liquid under treatment, as well as a higher rate of circulation, for a given power consumption. It also, as will be later explained, permits a saving in the structural cost of aerating plant.

According to this invention, in aeration apparatus of the type referred to, a substantially flat annular shroud is arranged concentric with the cone for rotation therewith in a horizontal plane spaced above the upper edge thereof, such shroud extending into the path of the discharged liquid and serving to deflect the same downwardly.

In applying the invention to an internally-bladed cone, the inner parts of the blades may be extended upwardly and reinforced by a concentric ring, which may be attached to the periphery of a driving disc or connected by spokes to a central hub, the shroud being secured to such driving disc or spokes as the case may be.

In the accompanying drawings.

Figure 1:
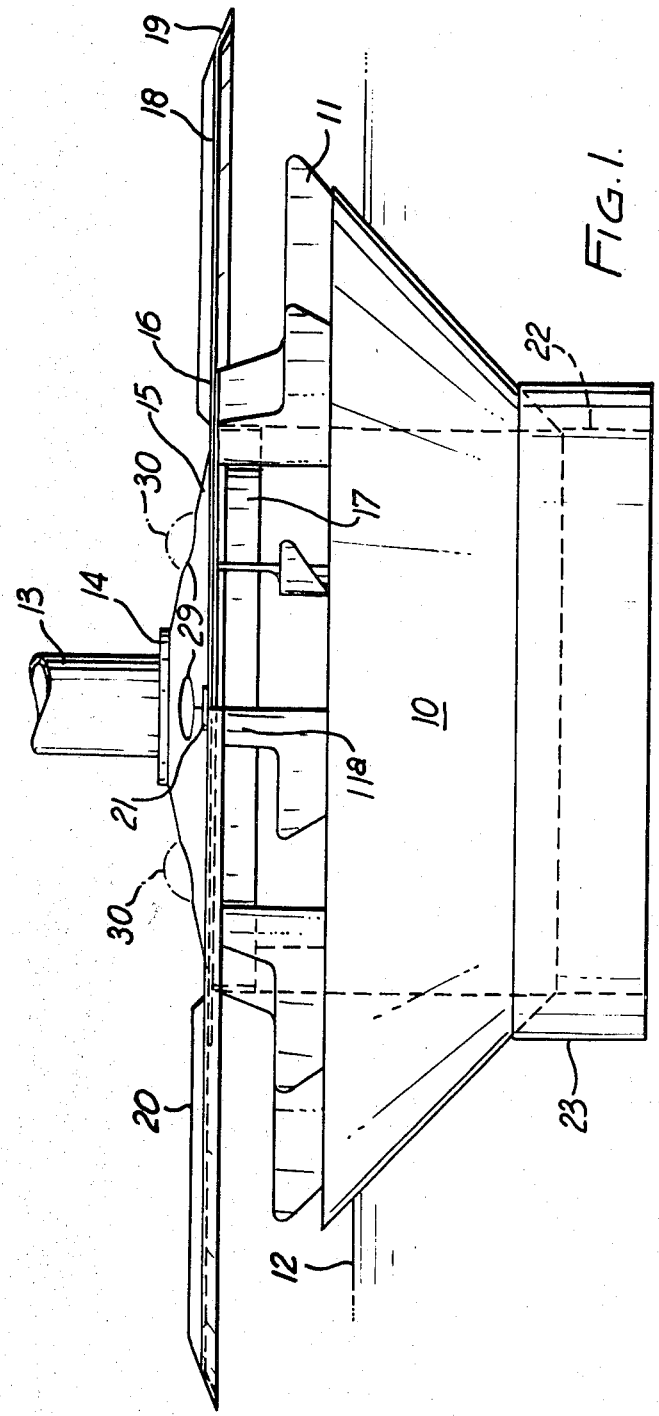
FIG. 1 is a side elevation of an aerating cone shrouded in accordance with the present invention.

In the example illustrated in FIG. 1, the aerating cone 10 is provided in known manner with internal blades 11 projecting somewhat above its lip, which is maintained in a plane somewhat higher than the static liquid level 12 by suspension of the cone from an overhead bridge or other support through the medium of a hollow vertical shaft 13 drive by a geared electric motor.

A flange 14 at the lower end of this shaft is bolted to the inner periphery of a domed steel driving disc 15 whose flat outer edge 16 is welded to upwardly-extended inner parts of the blades 11 in concentricity with the cone, these blade extensions 11a aforesaid being reinforced by a ring 17 produced by rolling a steel strip to cylindrical form.

Bolted to the outer edge 16 of the driving disc 15 between its attachments to the blade extensions 11a is a flat concentric annular shroud 18, which overhangs the cone 10 and terminates in a continuous downwardly-inclined lip 19.

For use with a cone 10 of six feet overall diameter with the upper edges of the blades 11 for the most part three inches above its lip, this shroud 18 is conveniently made seven feet in diameter over its flat surface, the peripheral lip 19 being two inches wide and inclined downwards at 20 degrees to the horizontal, whilst the clearance between the cone 10 and the underside of the shroud 18 is seven and a half inches.

The shroud, which may be of relatively light-gauge metal and stiffened by a plurality of (say, four) radial ribs 20 on its upper surface, is preferably formed in two halves, which are joined together by bolting the diametral edges of one half to overhanging plates 21 welded along those of the other half.

It will be appreciated that the upsurge of liquid above the rotating cone 10 is baffled by the overhanging part of the shroud 18, whose lip 19 deflects it forcefully downwards in a substantially continuous sheet so as to encourage re-circulation of such liquid toward the floor of the tank in which the cone is operating, and thence inwards toward the mouth of an uptake member which may be a cylindrical neck 22 and/or flared skirt united to the lower edge of the cone or a stationary tube which enters between the neck 22 and a similar member 23 of larger diameter to make an airtight running joint with such edge.

The shroud 18 has the further advantage of protecting the driving motor and gearhead from upflung spray, and the resultant accumulation of ice which occurs in cold weather, besides enabling the gearhead to be of shorter reach and the bridge or like support closer to the liquid surface 12 than would otherwise be practicable.

Figure 2:
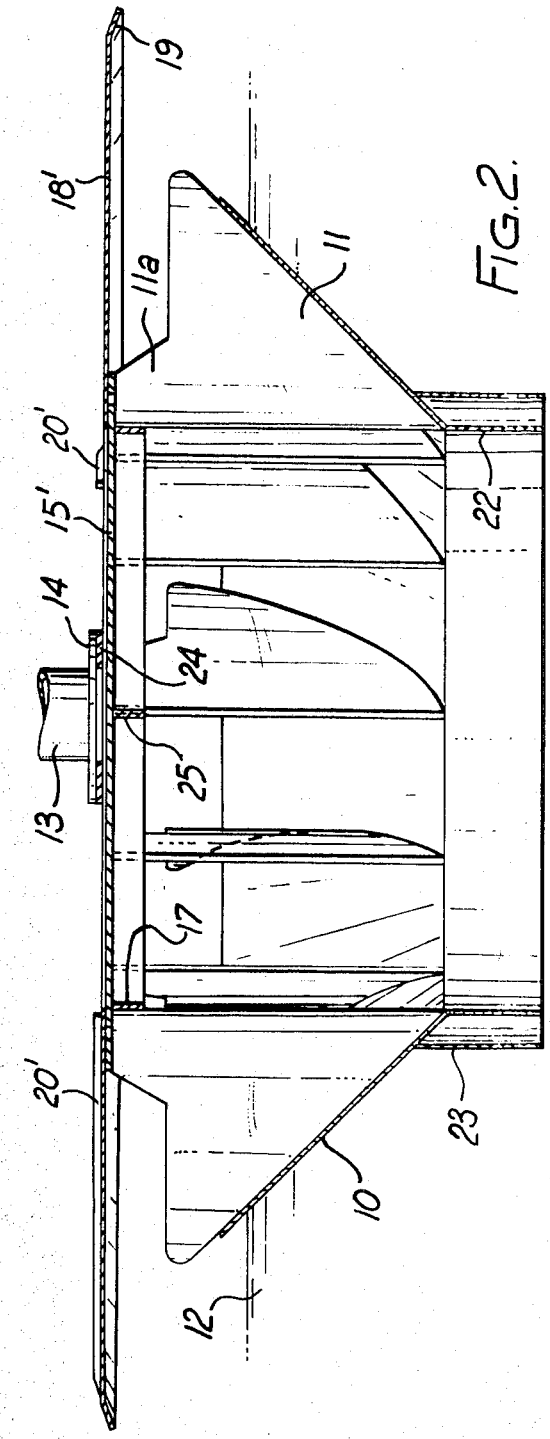
FIGS. 2 and 3 are a diametral section and fragmentary plan view, respectively, showing a modified construction of shroud.
Figure 3:
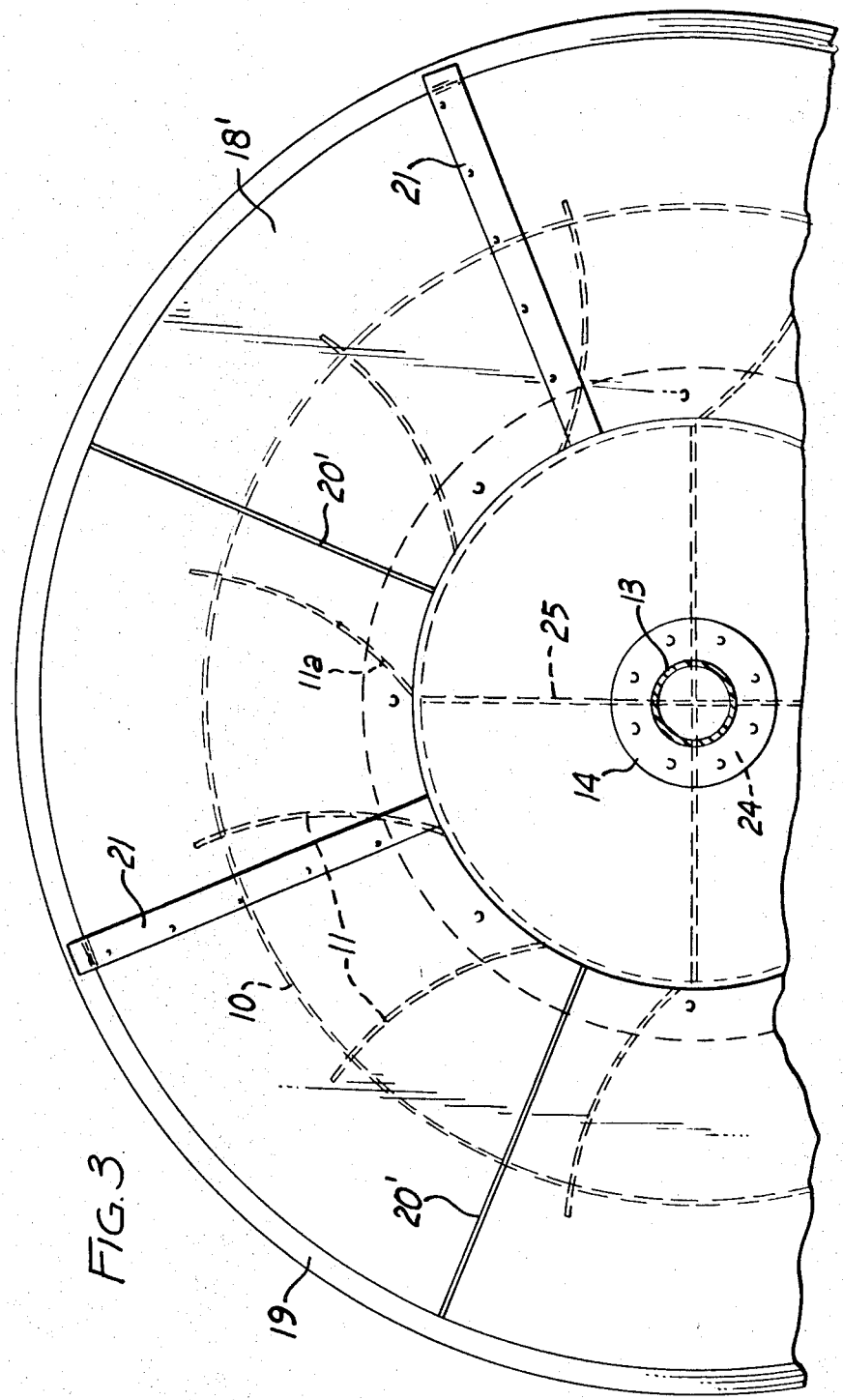

In the modified construction shown in FIGS. 2 and 3, which is suitable for the larger sizes of aerating cone (say, 8 feet diameter and over), the driving disc 15' is flat and has welded centrally thereof an annular reinforcement 24 to which the shaft flange 14 is bolted. The marginal portion of this disc is welded to the blade extensions 11a as well as to their reinforcing ring 17, which is also united to four radial ribs 25 fixed at the underside of the disc.

In this case the shroud 18' is formed in four identical sections, each lap-jointed to the next as above described, bolted to the periphery of the driving disc 15', and provided with a medial stiffening rib 20'.

Figure 4:
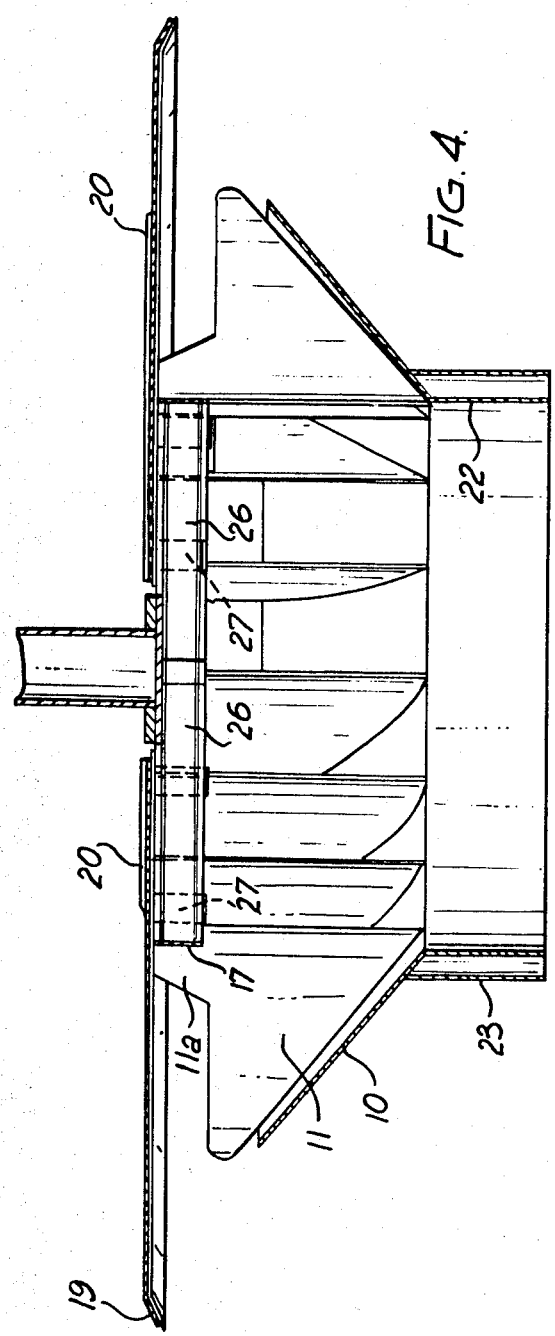
FIGS. 4 and 5 are views corresponding to FIGS. 2 and 3 respectively, but showing a further modification.
Figure 5:
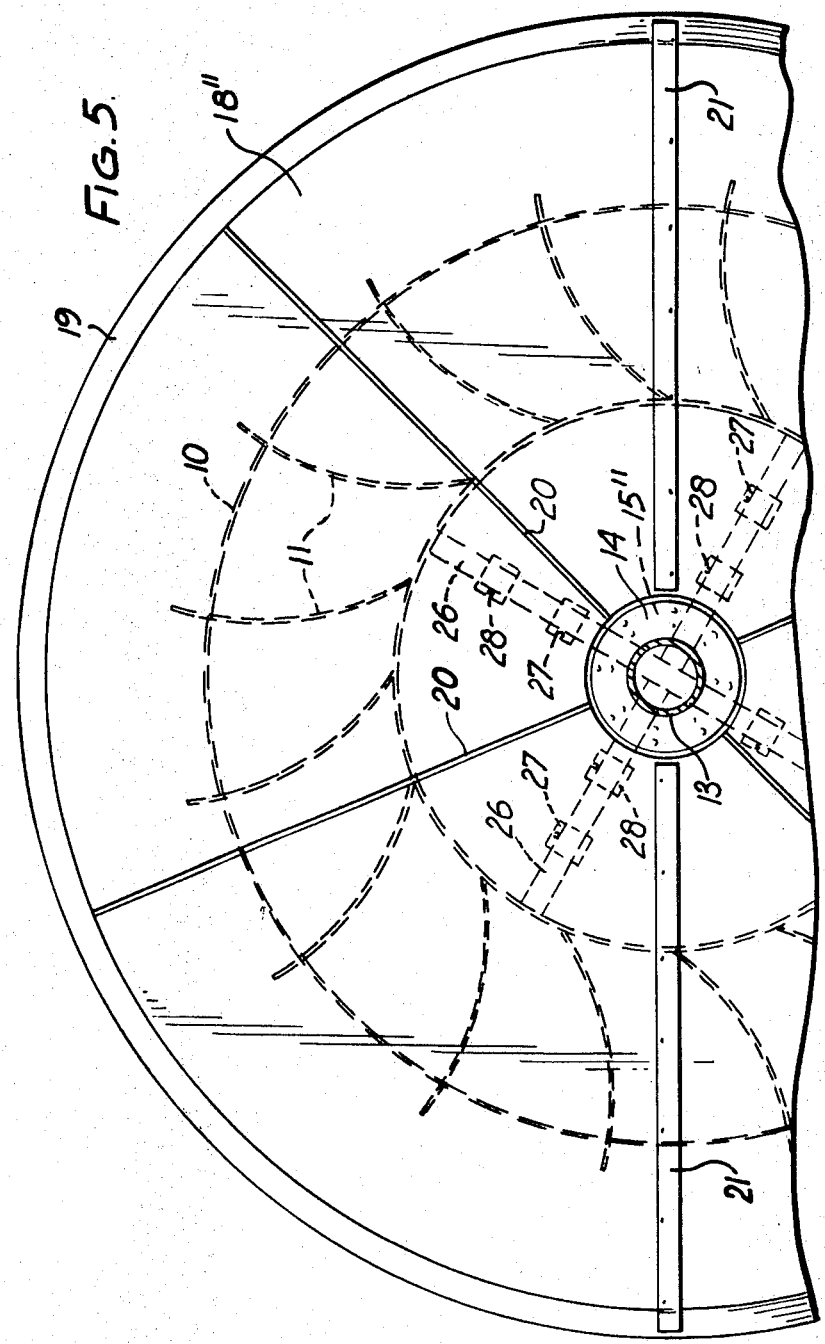

In the further modification shown in FIGS. 4 and 5, the driving disc 15" is equal in diameter to the shaft flange 14 and is connected to the blade-reinforcing ring 17 by means of four radial box-section spokes 26.

The shroud 18" is in two halves which are fitted around the disc 15", substantially flush therewith, and are partially rotated to engage channel brackets 27 at their undersides with the several spokes 26, a locking pin or bolt 28 through the limbs of at least one such bracket then locking the shroud assembly in place. Alternatively, the two halves of the shroud 18" may be secured directly upon the spokes by means of bolts engaging tapped holes in, or lugs provided on, the latter.

Figure 6:
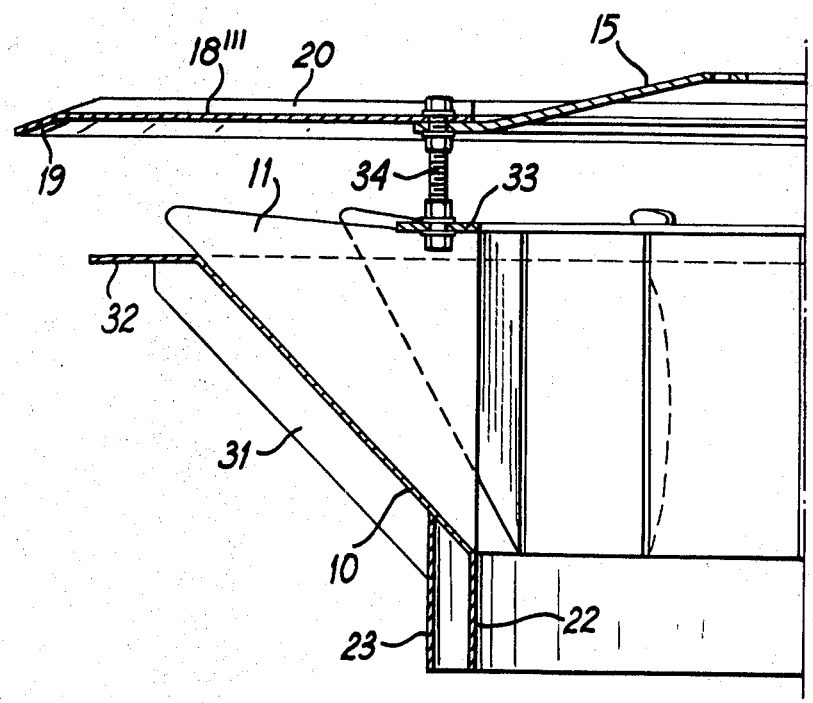
FIG. 6 is a fragmentary sectional side elevation of yet another modification.

In the still further modification shown in FIG. 6, the internal blading 11 is supplemented by a plurality of (say, six) radial blades 31 fixed to the exterior of the cone 10 and extending from the outer neck 23 of the latter to a flat horizontal lip 32 around its outer periphery. Such lip serves to diffuse the centrifugal discharge of liquid from the blades 31.

It will be noted that the blades 11 have no upward extensions at their inner corners, which are fixed directly to a flat reinforcing ring 33 connected by adjustable studs 34 to the outer edge of the domed driving disc 15, the inner periphery of the shroud 18'" being secured to the latter by means of the same studs.

Figure 7:
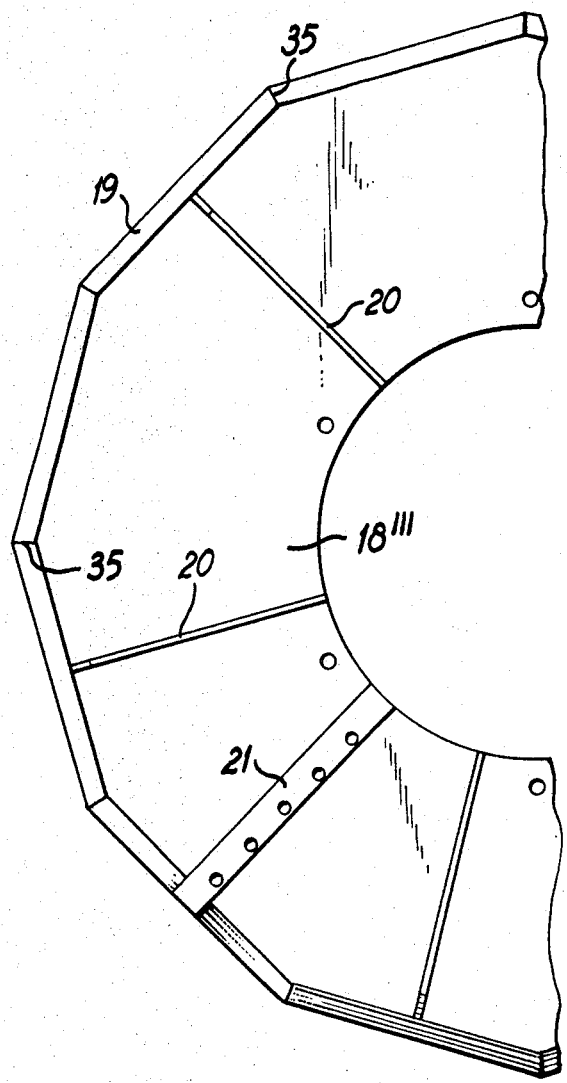
FIG. 7 is a fragmentary plane view of the shroud shown in FIG. 6.

The shroud 18'" aforesaid resembles the corresponding part in FIGS. 1 to 3, but to facilitate manufacture it is not of circular profile, but polygonal; for example duodecagonal as shown in FIG. 7. This form enables the downwardly inclined peripheral lip 19 to be produced by notching the edge of each half of the shroud at appropriate intervals, and bending the intervening parts of such edge as flat flanges of uniform width which are then welded end-to-end as at 35. Obviously this method of forming the lip 19, which in no way affects the performance of the shroud, may be applied to any of the embodiments previously described.

It may be found advantageous to provide for admission of air to the central part of the cone 10 during operation thereof. For example, there may be a plurality of (say, four) circular or other holes 29 in the domed driving disc 15 of FIGS. 1 and 6, or in the flat disc 15' of FIGS. 2 and 3, or in the case of FIGS. 4 and 5 there may be radial slots in the shroud 18" itself. The holes or slots aforesaid may be cowled or louvred (as indicated at 30 in FIG. 1) in such manner as to induce an inward flow of air as the cone 10 rotates.

What we claim is:

1. Surface aeration apparatus for progressively treating a body of liquid, comprising an inverted truncated cone mounted for rotation about a vertical axis whilst at least partially submerged in said liquid, blades fixed to the interior surface of said cone whereby liquid entering at the bottom opening of said cone is discharged upwardly and outwardly over the upper edge thereof by centrifugal force, and an annular shroud arranged concentric with said cone for rotation therewith in a horizontal plane spaced above the upper edge of said cone, said shroud including a substantially flat portion extending radially outwardly beyond said cone and into the path of said discharged liquid and including also a downwardly inclined continuous lip at the outer edge of said flat portion for directing the discharged liquid in a substantially continuous sheet forcefully back at the upper surface of said body of liquid for causing circulation in said body.

2. Apparatus as claimed in claim 1, including extensions of the inner parts of said blades above the upper edge of said cone and a reinforcing ring connecting said blade extensions and concentric with said cone.

3. Apparatus as claimed in claim 1, including extensions of said blades above the upper edge of said cone, a reinforcing ring connecting said blade extensions and concentric with said cone, and a driving disc for said cone having peripheral attachment to said reinforcing ring and to the inner edge of said shroud.

4. Apparatus as claimed in claim 1, including extensions of said blades above the upper edge of said cone, a reinforcing ring connecting said blade extensions and concentric with said cone, a driving hub for said cone, and spokes connecting said hub to said ring, said shroud being detachably secured to said spokes.

5. Apparatus as claimed in claim 1, wherein said shroud is formed in a plurality of sections each lap-jointed to the next.

6. Apparatus as claimed in claim 1, including ribs provided radially of the upper surface of said shroud to stiffen the latter.

7. Apparatus as claimed in claim 1, including a driving disc for said cone with peripheral attachments to the inner edge of said shroud and with apertures allowing inflow of air to the central part of said cone.

8. Apparatus as claimed in claim 1, wherein said shroud has apertures therein allowing inflow of air to the central part of said cone.

9. Apparatus as claimed in claim 1, wherein the cone has external blades leading to a flat peripheral lip thereon.

10. Apparatus as claimed in claim 1, wherein the outer profile of the shroud is a regular polygon each side of which has a flat flange bent therefrom, the several flanges being united end-to-end to form a continuous downwardly-directed lip.

References Cited

UNITED STATES PATENTS

| | | | |
|---|---|---|---|
| 3,218,042 | 11/1965 | Ciabattari et al. | 259—95 |
| 3,235,233 | 2/1966 | Bolton | 259—134 |
| 3,246,882 | 4/1966 | Clough | 259—135 |

WILLIAM I. PRICE, Primary Examiner